(12) United States Patent
Cheng

(10) Patent No.: US 9,326,353 B2
(45) Date of Patent: Apr. 26, 2016

(54) TRAILING-EDGE-PHASE-CONTROLLED LIGHT MODULATING CIRCUIT

(71) Applicant: Yung Pun Cheng, Hong Kong (CN)

(72) Inventor: Yung Pun Cheng, Hong Kong (CN)

( * ) Notice: Subject to any disclaimer, the term of this patent is extended or adjusted under 35 U.S.C. 154(b) by 0 days.

(21) Appl. No.: 14/115,312

(22) PCT Filed: May 10, 2013

(86) PCT No.: PCT/CN2013/075476
§ 371 (c)(1),
(2) Date: Nov. 1, 2013

(87) PCT Pub. No.: WO2013/170727
PCT Pub. Date: Nov. 21, 2013

(65) Prior Publication Data
US 2015/0002022 A1    Jan. 1, 2015

(30) Foreign Application Priority Data

May 17, 2012 (CN) ...................... 2012 2 0222572 U

(51) Int. Cl.
*H05B 37/00* (2006.01)
*H05B 37/02* (2006.01)
*H05B 33/08* (2006.01)
*H05B 39/04* (2006.01)

(52) U.S. Cl.
CPC ............ *H05B 37/02* (2013.01); *H05B 33/0848* (2013.01); *H05B 39/048* (2013.01); *Y02B 20/348* (2013.01)

(58) Field of Classification Search
USPC ............. 315/127, 172, 186, 193, 200 R, 205, 315/209 R, 291, 297, 299, 307, 308, 313, 315/352, 362
See application file for complete search history.

(56) References Cited

FOREIGN PATENT DOCUMENTS

| CN | 1288348 A | 3/2001 |
|---|---|---|
| CN | 101176386 A | 5/2008 |
| CN | 201986220 U | 9/2011 |
| CN | 202617436 U | 12/2012 |
| WO | 2011128798 A1 | 10/2011 |

OTHER PUBLICATIONS

State Intellectual Property Office of China, International Search Report and Written Opinion of PCT/CN2013/075476, WIPO, Aug. 15, 2013, 11 pages.

*Primary Examiner* — Douglas W Owens
*Assistant Examiner* — Jianzi Chen
(74) *Attorney, Agent, or Firm* — Alleman Hall McCoy Russell & Tuttle LLP

(57) ABSTRACT

A single-pole (two-wire system) phase-controlled trailing-edge light-modulating circuit comprises a full-bridge rectification circuit, a power supply circuit, a light-modulating control circuit, and a voltage detection circuit. The light-modulating control circuit utilizes a CMOS chip and controls a field effect transistor by detecting specific voltage level to perform a trailing-edge phase control action for modulating light output of resistively and/or capacitively loaded light bulbs, e.g. LED light bulbs. The light-modulating control circuit connects to various lighting loads in series. In addition, the triggering circuit and the power supply circuit of are independent to avoid mutual restrictions to each other that might affect the adjustment of the maximum conduction phase angle.

6 Claims, 2 Drawing Sheets

TRAILING-EDGE-PHASE-CONTROLLED LIGHT MODULATING CIRCUIT

TECHNICAL FIELD

The present utility model relates to illumination electrical circuitry, and more particularly to a single-pole (two-wire system) trailing-edge phase-controlled light-modulating circuit compatible with various loads.

BACKGROUND

Most of the existing leading-edge light bulb dimming circuitries use triad to control the phase of supply voltage, which always produces large surge current spikes and thus has a poor applicability in capacitive impedance LED lamps, electronic spotlights, electronic ballast controlled fluorescent lamps, electronic energy-saving lamps, etc.

Most of the existing trailing-edge light bulb dimmers use two input wires and two output wires (e.g., four-wire systems), which makes the installation more complicated due to additional wires needing to be connected. For example, a main power supply 7 such as an indoor electrical junction box generally provides one live wire and one neutral wire for connecting to lighting loads; therefore, if a three-wire or four-wire system is to be installed, additional wires need to be provided, and the original electrical wiring will need to be changed, which results in increased labor and material costs.

Chinese Patent Application No. 00125744.7 discloses a trailing-edge phase-controlled four-wire system light bulb dimmer. Chinese Patent Application No. 201120003889.0 discloses a two-wire system trailing edge dimmer, in which the triggering circuit and the power supply circuit are connected together. The dimming adjustment not only changes the output voltage, it also changes the voltage level of the supply voltage. Therefore, there is a requirement for further improvement.

SUMMARY

In the present disclosure, a single-pole (two-wire system) trailing-edge dimming circuit is provided, comprising: a bridge rectification circuit, a power supply circuit, a light-modulating control circuit (alternatively referred to herein as a dimming control circuit), a voltage detection circuit, and an ON/OFF switch circuit; wherein, the bridge rectification circuit has one input terminal connected to the live wire and the other input terminal connected to a load, e.g. a light bulb, which is further connected to the neutral wire; the power supply circuit, the voltage detection circuit, and the ON/OFF switch are all connected in parallel between the positive output terminal and the negative output terminal of the bridge rectification circuit; three input terminals of the dimming control circuit are connected to the negative output terminal of the bridge rectification circuit, the output terminal of the power supply circuit, and the output terminal of the voltage detection circuit, respectively; and the output terminal of the dimming control circuit is connected to the input terminal of the ON/OFF switch.

In a further embodiment, the dimming control circuit may utilize a CMOS chip such as a dual monostable multivibrator IC 4528.

In a further embodiment, the bridge rectification circuit comprises a switch SW1, a fuse F1, a varistor RV1 and a bridge rectification diode BD1. SW1 has one end connected to the live wire of the main power supply and the other end connected to one end of the fuse F1. The other end of the fuse F1 is connected to one end of RV1 and one AC input terminal of BD1. The other end of RV1 and the other AC input terminal of BD1 are connected together and function as the output terminal of the two-wire system trailing-edge dimming circuit.

In a further embodiment, the power supply circuit comprises a diode D1, a resistor R2, a resistor R3, a capacitor C9, a Zener diode ZD2, a field effect transistor Q1, and a capacitor C4. D1 has its positive terminal connected to the positive output terminal of the full-bridge rectification circuit and its negative terminal connected to one end of R2 and R3; the other end of R3 is connected to the drain of Q1, and the other end of R2 is connected to the gate of Q1. ZD2 and C9 are connected in parallel. The positive terminal of ZD2 and the negative terminal of C4 are connected together to the negative output terminal of the bridge rectification circuit; the source of Q1 and the positive terminal of C4 are connected together and function as a positive output.

In a further embodiment, the voltage detection circuit comprises a resistor R9, a Zener diode ZD1, a resistor R13, a capacitor C6, and a transistor Q6. R9 has one end connected to the positive output terminal of the full-bridge rectification circuit and the other end connected to the negative end of ZD1. the positive end of ZD1 is connected to one end of R13, one end of C6, and the base of Q6, while the other end of R13 and the other end of C6 are connected to the emitter of Q6, and all three of them are connected to the negative output terminal of the full-bridge rectification circuit. The collector of Q6 is connected to the light-modulating control circuit.

In a further embodiment, the active switch comprises a field effect transistor Q4, a resistor R1, a transistor Q2, a transistor Q3, a resistor R11 and a resistor R7. R1 has one end connected to the positive output of the power supply circuit and the other end connected to the collector of Q2. The emitter of Q2 is connected to the emitter of Q3, one end of R7, and the gate of Q4. The other end of R7 is connected to the collector of Q3 and the source of Q4, which together are connected to the negative output terminal of the full-bridge rectification circuit. The drain of Q4 is connected to the positive output terminal of the full-bridge rectification circuit, while R11 has one end connected to the base of Q2 and the base of Q3 and the other end connected to the light-modulating control circuit.

The advantageous effects of the present utility model include: simple installation due to only two wires being required for the light-modulating circuit; a wide application range for both resistive and capacitive load lamps, including capacitive load LED lamps, electronic spotlights, electronic ballast controlled fluorescent lamps, and electronic energy-saving lamps; and independence of the triggering circuit and the power supply circuit, which avoids mutual restrictions among the triggering circuit and the power supply circuit which might affect the adjustment of the maximum conduction phase angle. In addition, a linear voltage power supply has been used to simplify the dimming control circuit.

DETAILED DESCRIPTION

The technical solutions of the present utility model will be described in detail through the following embodiments in connection the drawings.

Figure 1:
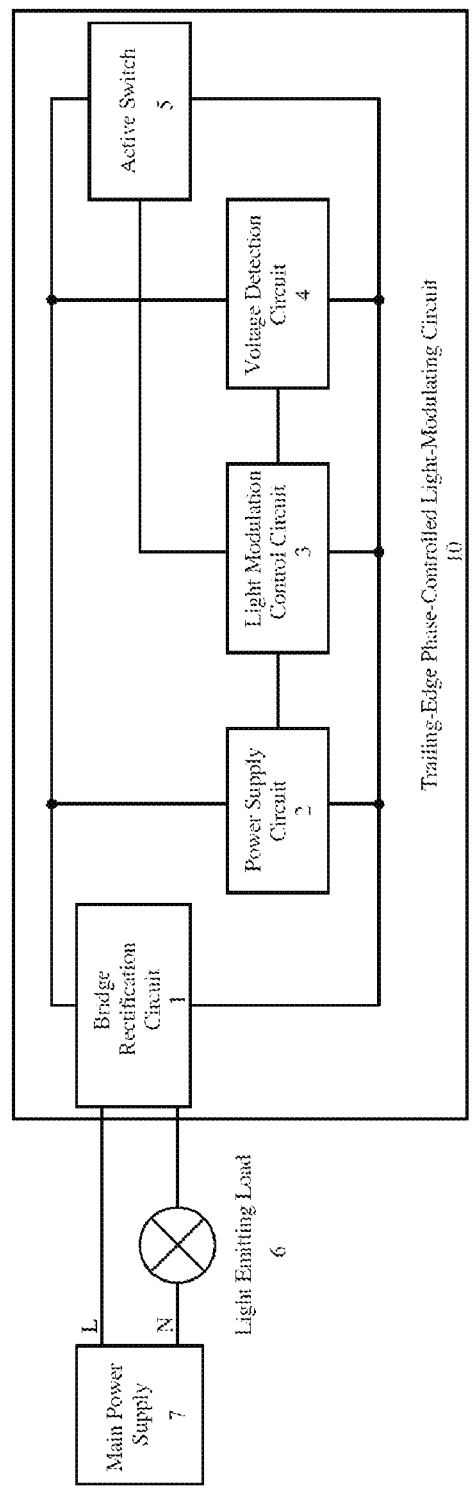
FIG. 1 is a block diagram showing the principle of the utility model.

As shown in FIG. 1, a trailing-edge (two-wire system) phase-controlled light-modulating circuit 10 according to the present invention comprises a full-bridge rectification circuit 1, a power supply circuit 2, a light-modulating control circuit 3, a voltage detection circuit 4, and an active switch 5. The full-bridge rectification circuit 1 has one input terminal connected to the live wire (L) and the other input terminal connected to a light-emitting load 6, which is further connected to the neutral wire (N). The power supply circuit 2, the voltage detection circuit 4, and the active switch 5 are all connected in parallel between the positive output terminal and the negative output terminal of the full-bridge rectification circuit 1. Three input terminals of the light-modulating control circuit 3 are connected to the negative output terminal of the full-bridge rectification circuit 1, the output terminal of the power supply circuit 2, and the output terminal of the voltage detection circuit 4, respectively, and the output terminal of the light-modulating control circuit 3 is connected to the input terminal of the active switch 5. The light-emitting load 6 in this embodiment can be either resistive or capacitive, or a combination of resistively and capacitively loaded lamps, such as incandescent lamps, capacitive impedance LED lamps, electronic energy-saving lamps, electronic ballast controlled fluorescent lamps, electronic spotlights, etc.

The working principle of the present invention is as follows. The main AC electrical supply is converted, by the full-bridge rectification circuit 1, into the electrical supply of the positive half cycle of a sine wave which is used as the input power supply for the power supply circuit 2, the voltage detection circuit 4 and the active switch 5. The power supply circuit 2 provides a stable DC working voltage to the light-modulating control circuit 3 and the active switch 5 in a linear voltage manner. The voltage detection circuit 4 produces a triggering signal for the light-modulating circuit 3 when the voltage of each input half cycle is lower than the preset voltage detection value. Upon receiving the trigger signal from the voltage detection circuit 4, the light-modulating control circuit 3 generates two delayed signals simultaneously, with one delay signal controlling the conduction phase angle of the active switch 5, and the other delay signal shielding the trigger signal which is generated by voltage detection circuit 4, so as to prevent a secondary trigger in one delay period. The active switch 5 controls the ON/OFF action according to the control signal of the light-modulating control circuit 3, and achieves the control of the electrical conduction phase angle.

Figure 2:
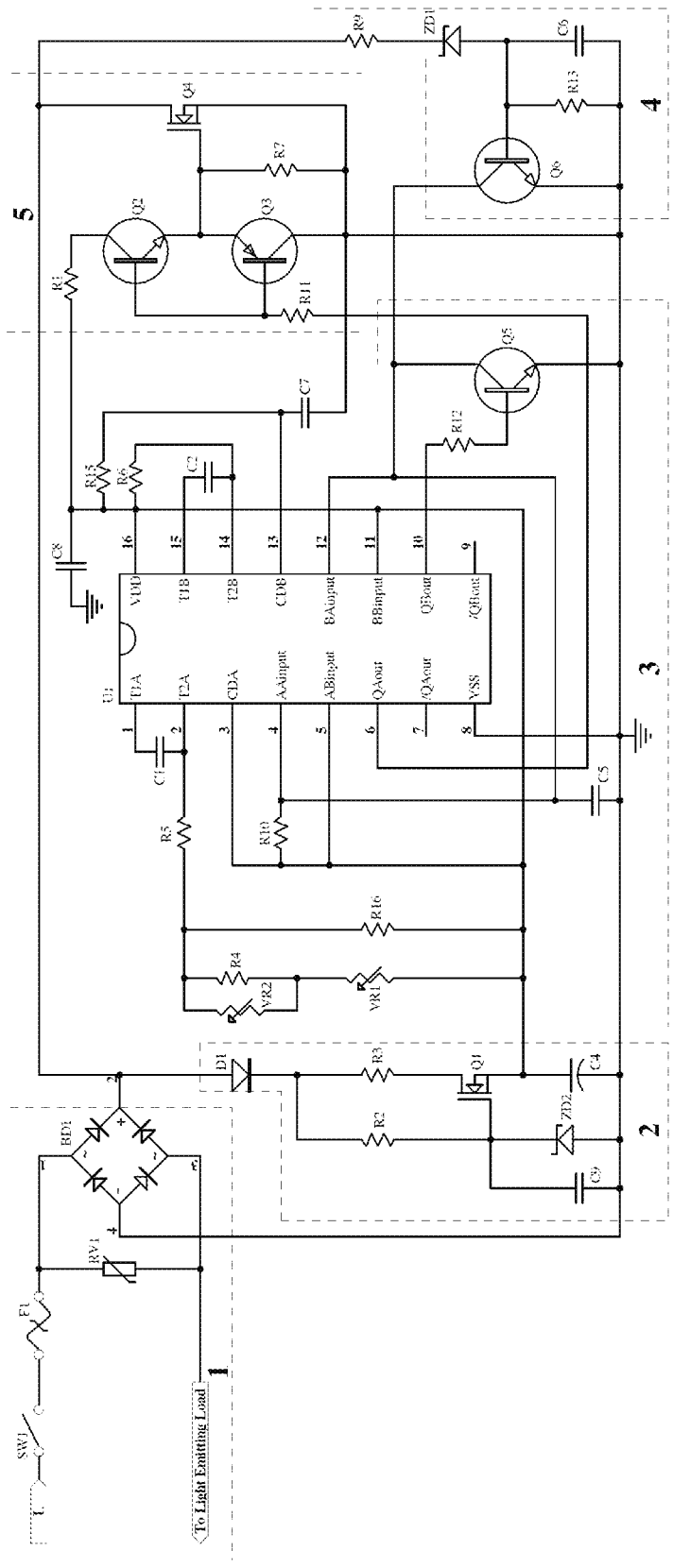
FIG. 2 is the principle diagram of one embodiment of the utility model.

The specific circuit diagram of the present utility model is shown in FIG. 2. The full-bridge rectification circuit 1 is used to convert the input AC power into the positive half cycle of a sine wave to meet the power input requirement by the power supply circuit 2, the voltage detection circuit 4, and the active switch 5. In this embodiment, the full-bridge rectification circuit 1 comprises a switch SW1, a fuse F1, a varistor RV1 and a bridge rectification diode BD1. The switch SW1 has one end connected to the live wire (L) of the main power supply and the other end connected to one end of the fuse F1. The other end of the fuse F1 is connected to one end of RV1 and one AC input terminal of the bridge rectification diode BD1, while the other end of RV1 and the other AC input terminal of the bridge rectification diode BD1 are connected together and function as the output terminal of the single-pole (two-wire system) trailing-edge light-modulating circuit. The positive and negative terminals of the bridge rectification diode BD1 function as the positive and negative output terminals of the full-bridge rectification circuit 1, respectively. After passing through the full-bridge rectification circuit 1, the AC power is output as the positive half cycle of a sine wave between the positive end and the negative ends of the bridge rectification diode BD1.

The power supply circuit 2 functions to provide a stable working voltage for the light-modulating control circuit 3 and the active switch 5 in a linear voltage manner. In this embodiment, the power supply circuit 2 comprises a diode D1, a resistor R2, a resistor R3, a capacitor C9, a Zener diode ZD2, a field effect transistor Q1, and a capacitor C4. The diode D1 has its positive terminal connected to the positive output terminal of the full-bridge rectification circuit 1 and its negative terminal connected to one end of the resistors R2 and R3. The other end of the resistor R3 is connected to the drain of the field effect transistor Q1, and the other end of the resistor R2 is connected to the gate of the field effect transistor Q1, the negative terminal of the Zener diode ZD2, and one end of the capacitor C9. The other end of the capacitor C9, the positive terminal of the Zener diode ZD2, and the negative terminal of the capacitor C4 are connected together to the negative output terminal of the full-bridge rectification circuit 1. The source of the field effect transistor Q1 and the positive terminal of the capacitor C4 are connected together and function as a positive output terminal of the power supply circuit. With the Zener diode ZD2 on the gate of the field effect transistor Q1, the voltage across the capacitor C4 is stabilized at (Vzd2−Vgs). Due to the unidirectional conduction characteristics of the diode D1, capacitor C4 is prevented from discharging when the output voltage of the full-bridge rectification circuit 1 is lower than the voltage across the capacitor C4, and thus the voltage stability of C4 is improved.

In this embodiment, the light-modulating control circuit 3 comprises a CMOS chip, specifically a retriggerable dual monostable IC 4528 (U1), as the core, and two retriggerable monostable circuits A and B. The monostable circuit A comprises an adjustable resistor VR1, an adjustable resistor VR2, a resistor R4, a resistor R5, a resistor R16, and a capacitor C1, and functions to set the delay time of the conduction phase angle. VR1 has one end connected to the positive output terminal of the power supply circuit 2 and the other end connected to one end of the parallel connection of VR2 and R4, while the other end of the parallel connection of VR2 and R4 is connected to the pin 2 of U1 via R5. R16 is connected in parallel with the circuit composed of VR1, VR2, and R4. C1 is connected between pin 1 and pin 2 of U1. VR1 can be modulated to adjust the conduction phase angle, VR2 and R4 are used to set the minimum conduction phase angle, R5 and R16 are used to set the maximum conduction phase angle, and the positive output end of the monostable circuit A drives the active switch 5. The other monostable circuit B comprises a resistor R6 and a capacitor C2 and functions to set a time for preventing the delay signal from being triggered for a second time, wherein R6 is connected between pin 14 and pin 16 of U1, C2 is connected between pin 14 and pin 15 of U1, and the positive output end of the monostable circuit B is reversed by the transistor Q5 and then pulls down the level of the trigger input of the trigger A, so as to prevent secondary trigger in one delay period.

The voltage detection circuit 4 generates a triggering signal for the light-modulating control circuit 3 when the output voltage of the full-bridge rectification circuit 1 is below a certain voltage value. In this embodiment, the voltage detection circuit 4 comprises a resistor R9, a Zener diode ZD1, a resistor R13, a capacitor C6, and a transistor Q6. R9 has one end connected to the positive output terminal of the full-bridge rectification circuit 1 and the other end connected to the negative end of ZD1. The positive end of ZD1 is connected to one end of R13, C6, and the base of Q6. The other end of R13 and the other end of C6 are connected to the emitter of Q6, and to the negative output terminal of the full-bridge rectification circuit 1. The collector of Q6 is connected to the light-modulating control circuit 3. The output voltage of the full-bridge rectification circuit 1 is divided by R9, ZD1 and R13, and when a divided voltage is lower than the conduction voltage of the transistor Q6, the transistor Q6 is cut off and generates a rising-edge trigger signal for the light-modulating control circuit 3.

The active switch 5 utilizes a field effect transistor as a switch and switches ON/OFF in response to the control signal of the light-modulating control circuit 3 to achieve control of the conduction phase angle of the electrical supply to the electrical load. In this embodiment, the active switch 5 comprises a field effect transistor Q4, a resistor R1, a transistor Q2, a transistor Q3, a resistor R11, and a resistor R7. R1 has one end connected to the positive output terminal of the power supply circuit 2 and the other end connected to the collector of Q2. The emitter of Q2 is connected to the emitter of Q3, one end of R7, and the gate of Q4. The other end of R7 is connected to the collector of Q3 and the source of Q4, and to the negative output terminal of the full-bridge rectification circuit 1. The drain of Q4 is connected to the positive output terminal of the full-bridge rectification circuit 1. R11 has one end connected to the base of Q2 and the base of Q3, and the other end connected to the light-modulating control circuit 3. Q2 and Q3 form a driving circuit for Q4 to activate and accelerate the switching speed of Q4.

The present invention has been described in above embodiments with respect to the drawings.

I claim:

1. A single pole two-wire system phase control trailing edge light modulating circuit, characterized in that:
   a full-bridge rectification circuit;
   a power supply circuit;
   a light-modulating control circuit;
   a voltage detection circuit; and
   an active switch;
   wherein the full-bridge rectification circuit has one input terminal connected to a Live wire and another input terminal connected to a light-emitting load which is further connected to a neutral wire; the power supply circuit, the voltage detection circuit and the active switch are all connected in parallel between a positive output terminal and a negative output terminal of the full-bridge rectification circuit; three inputs of the light-modulating control circuit are connected to the negative output terminal of the full-bridge rectification circuit, an output terminal of the power supply circuit, and an output terminal of the voltage detection circuit, respectively; and an output terminal of the light-modulating control circuit is connected to an input terminal of the active switch.

2. The single pole two-wire system phase control trailing edge light modulating circuit according to claim 1, characterized in that the light-modulating control circuit utilizes a retriggerable dual monostable IC 4528.

3. The single pole two-wire system phase control trailing edge light modulating circuit according to claim 1, characterized in that the full-bridge rectification circuit comprises a switch (SW1), a fuse (F1), a varistor (RV1) and a bridge rectification diode (BD1); wherein (SW1) has one end connected to the Live wire of the main supply and the other end connected to one end of (F1), the other end of (F1) is connected to one end of (RV1) and one AC input terminal of (BD1), the other end of (RV1) and the other AC input terminal of (BD1) are connected together and function as the output terminal of the single pole two-wire system phase control trailing edge light modulating circuit; the positive and negative terminals of (BD1) function as the positive and negative output terminals of the full-bridge rectification circuit, respectively.

4. The single pole two-wire system phase control trailing edge light modulating circuit according to claim 1, characterized in that the power supply circuit comprises a diode (D1), a resistor (R2), a resistor (R3), a capacitor (C9), a Zener diode (ZD2), a field effect transistor (Q1), and a capacitor (C4); wherein (D1) has its positive terminal connected to the positive output of the full-bridge rectification circuit and its negative terminal connected to one end of (R2) and (R3), the other end of (R3) is connected to a drain of (Q1), the other end of (R2) is connected to a gate of (Q1), a negative terminal of (ZD2), and one end of (C9), the other end of (C9), a positive terminal of (ZD2), and a negative terminal of (C4) are connected together to the negative output terminal of the full-bridge rectification circuit; a source of (Q1) and a positive terminal of (C4) are connected together and function as a positive output.

5. The single pole two-wire system phase control trailing edge light modulating circuit according to claim 1, characterized in that the voltage detection circuit comprises a resistor (R9), a Zener diode (ZD1), a resistor (R13), a capacitor (C6) and a transistor (Q6); wherein (R9) has one end connected to the positive output of the full-bridge rectification circuit and the other end connected to a negative end of (ZD1), a positive end of (ZD1) is connected to one end of (R13), (C6), and a base of (Q6), the other end of (R13) and (C6) is connected to an emitter of (Q6) and both of them are connected to the negative output of the full-bridge rectification circuit, a collector of (Q6) is connected to the light-modulating control circuit.

6. The single pole two-wire system phase control trailing edge light modulating circuit according to claim 1, characterized in that the active switch comprises a field effect transistor (Q4), a resistor (R1), a transistor (Q2), a transistor (Q3), a resistor (R11) and a resistor (R7); wherein (R1) has one end connected to a positive output of the power supply circuit and the other end connected to a collector of (Q2), an emitter of (Q2) is connected to an emitter of (Q3), one end of (R7), and a gate of (Q4), the other end of (R7) is connected to a collector of (Q3) and a source of (Q4) and both of them are connected to the negative output of the full-bridge rectification circuit, a drain of (Q4) is connected to the positive output of the full-bridge rectification circuit, (R11) has one end connected to a base of (Q2) and a base of (Q3) and the other end connected to the light-modulating control circuit.

* * * * *